(12) United States Patent
Niimi

(10) Patent No.: US 6,812,642 B1
(45) Date of Patent: Nov. 2, 2004

(54) JOINED BODY AND A HIGH-PRESSURE DISCHARGE LAMP

(75) Inventor: Norikazu Niimi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/621,210

(22) Filed: Jul. 16, 2003

Related U.S. Application Data

(60) Division of application No. 09/847,058, filed on May 1, 2001, now Pat. No. 6,642,654, which is a continuation-in-part of application No. 09/794,760, filed on Feb. 27, 2001, now abandoned, which is a continuation-in-part of application No. 09/631,419, filed on Aug. 3, 2000, now Pat. No. 6,703,136.

(30) Foreign Application Priority Data

Jul. 3, 2000 (JP) ........................................ 2000-200536

(51) Int. Cl.$^7$ ................................................ H01J 17/04
(52) U.S. Cl. ...................... 313/623; 313/625; 313/624; 428/469
(58) Field of Search ................................ 313/623, 625, 313/572, 573, 634, 636, 632; 220/21 R; 428/469, 304.1, 397, 701, 446, 702

(56) References Cited

U.S. PATENT DOCUMENTS

| | | | |
|---|---|---|---|
| 4,310,773 A | 1/1982 | Zukowski et al. | |
| 4,353,623 A | 10/1982 | Maier | |
| 5,404,077 A | 4/1995 | Eichelbrönner et al. | |
| 5,424,608 A | 6/1995 | Juengst et al. | |
| 6,465,940 B1 | 10/2002 | Ikeuchi et al. | |

FOREIGN PATENT DOCUMENTS

| | | |
|---|---|---|
| EP | 0 452 275 | 10/1991 |
| EP | 0 726 238 A2 | 8/1996 |
| EP | 0 751 549 A1 | 1/1997 |
| EP | 0 982 278 A1 | 3/2000 |
| HU | 220 173 B | 3/1998 |
| JP | 53-33209 | 3/1978 |
| JP | 55-42228 A | 3/1980 |
| JP | 58-204880 A | 11/1983 |
| JP | 59-152275 A | 8/1984 |
| JP | 61-3809 | 1/1986 |
| JP | 61-201676 A | 9/1986 |
| JP | 62-56380 A | 3/1987 |
| JP | 1-099775 A | 4/1989 |
| JP | 1-212283 A | 8/1989 |
| JP | 1-236573 A | 9/1989 |

(List continued on next page.)

OTHER PUBLICATIONS

*Patent Abstracts of Japan*, vol. 2000, No. 21, Aug. 3, 2001 (JP 2001 110340).
*Patent Abstracts of Japan*, vol. 2000, No. 20, Jul. 10, 2001 (JP 2001 076678).

*Primary Examiner*—Vip Patel
*Assistant Examiner*—Joseph Williams
(74) *Attorney, Agent, or Firm*—Burr & Brown

(57) ABSTRACT

The invention provides a joined body of a first member made of a metal and a second member made of a ceramic or a cermet. The joined body comprises a joining portion interposed between the first member and the second member for joining the first and second members. The joining portion comprises main phase contacting the first member and an intermediate ceramic layer existing between the second member and the main phase and contacting the second member. The main phase is composed of a porous bone structure having open pores and is made of a sintered product of metal powder, and a ceramic phase impregnated into the open pores in the porous bone structure. The joined structure has resistance to fatigue and fracture, even when the structure is subjected to repeated thermal cycles between a high temperature, for example 1000° C. or higher, and room temperature.

15 Claims, 18 Drawing Sheets

FOREIGN PATENT DOCUMENTS

| | | | | | |
|---|---|---|---|---|---|
| JP | 1-236575 A | 9/1989 | JP | 6-126472 | 5/1994 |
| JP | 3-103369 A | 4/1991 | JP | 7-053278 A | 2/1995 |
| JP | 5-94945 | 12/1993 | JP | 7-247188 | 9/1995 |
| | | | JP | 8-253373 A | 1/1996 |
| | | | JP | 8-273616 A | 10/1996 |

JOINED BODY AND A HIGH-PRESSURE DISCHARGE LAMP

CROSS REFERENCE TO RELATED APPLICATIONS

This application is a division of U.S application Ser. No. 09/847,058, filed May 1, 2001, now U.S. Pat. No. 6,642,654, which is a continuation-in-part of U.S. application Ser. No. 09/794,760, filed Feb. 27, 2001, now abandoned, which in turn is a continuation-in-part of U.S. application Ser. No. 09/631,419, filed Aug. 3, 2000, now U.S. Pat. No. 6,703,136, the entireties of which are incorporated herein by reference.

BACKGROUND OF THE INVENTION

1. Field of the Invention

The present invention relates to a joined body, particularly relates to a high pressure discharge lamp using a ceramic discharge tube.

2. Description of the Related Art

A high pressure discharge lamp has a ceramic discharge tube with two end portions, in which sealing members (usually referred to as a ceramic plug) are inserted, respectively, to seal the respective end portions. A through hole is formed in each sealing member and a metal member, to which a predetermined electrode system is attached, is inserted within the through hole. An ionizable light-emitting material is introduced and sealed within the inner space of the discharge tube. Known high pressure discharge lamps include a high pressure sodium vapor and metal halide lamps, the latter exhibiting more superior color coordination. The lamp may be used in high temperature condition by forming the discharge tube by a ceramic material.

In such discharge lamp, it is necessary to air-tightly seal between the end portion of the ceramic discharge tube and a member for supporting an electrode system. The ceramic discharge tube has a main body with a shape of a tube with two narrow ends, or a barrel, or a straight tube. The ceramic discharge tube is made of, for example, alumina sintered body.

The specification of Japanese Patent Application No. 178,415/1999 (EPO EP0982278, A1) discloses the following structure. The joining portion between the end portion of a ceramic discharge tube and a member for supporting an electrode system comprises main phase contacting the discharge tube, and an intermediate ceramic layer contacting the supporting member and existing between the supporting member and the main phase. The main phase is composed of a porous bone structure, with open pores and made of a sintered product of metal powder, and ceramic phase impregnated into the open pores in said porous bone structure. Herewith, such joined structure has improved air-tightness and resistance to corrosion, and repeated thermal cycles does not result in the fracture of the joined structure.

SUMMARY OF THE INVENTION

The inventor further examined the above sealing structure and, therefore, achieved a joined structure having resistance to fatigue and fracture, even when the structure is subjected to repeated thermal cycles between a high temperature, for example 1000° C. or higher, and room temperature.

That is, it is an object of the invention to provide a joined structure having resistance to fatigue and fracture, even when the structure is subjected to repeated thermal cycles between a high temperature, for example 1000° C. or higher, and room temperature.

It is an other object of the invention to apply such joined structure to a high pressure discharge lamp, for improving the resistance to a corrosive gas, such as a metal halide, and the air-tightness and for avoiding the fracture of the joined structure due to repeated cycles of turning-ons and turning-offs.

The present invention provides a joined body of a first member made of a metal and a second member made of a ceramic or cermet. The joined body comprises a joining portion interposed between the first member and the second member for joining the first and second members, wherein the joining portion comprises main phase contacting the first member and an intermediate ceramic composition layer contacting the second member and existing between the second member and the main phase. The main phase is composed of a porous bone structure, made of a sintered product of metal powder and with open pores, and ceramic composition layer impregnated into the open pores in the porous bone structure. Each of the intermediate ceramic composition layer and said impregnated ceramic composition layer has a crystallinity of more than 50%.

The present invention further provides a ceramic discharge lamp comprising: a ceramic discharge tube with an inner space formed therein and end portions, the inner space being filled with an ionizable light-emitting material and a starter gas and an opening being formed within the end portion; an electrode system provided within the inner space; a sealing member with a through hole formed therein, a part of the sealing member being fixed within the opening of the ceramic discharge tube; and a metal member; wherein the metal member and the sealing member constitute the above air-tight joined body. The metal member is the first member and the sealing member is the second member.

The present invention further provides a ceramic discharge lamp comprising: a ceramic discharge tube with an inner space formed therein and end portions, the inner space being filled with an ionizable light-emitting material and a starter gas and an opening being formed within the end portion; an electrode system provided within the inner space; and a metal member; wherein the metal member and the ceramic discharge tube constitute the above air-tight joined body. The metal member is the first member and the ceramic discharge tube is the second member.

The present invention provides a joined structure of a first member made of a metal, such as molybdenum, and a second member made of a ceramic or a cermet, in which the members may be joined with a high strength, the joined structure has improved air-tightness and resistance to corrosion, and repeated thermal cycles do not result in the fracture of the joined structure. The invention provides a method for manufacturing the same.

BRIEF DESCRIPTION OF THE DRAWINGS

FIG. 17 is a cross sectional view schematically showing an embodiment of an end portion of a high pressure discharge lamp according to the invention, wherein a metal member 7 is joined to an end portion 1a of a discharge tube 1 and a metal element 7 and a metal axis of an electrode system 27 is electrically connected by a metallized layer 32, covering the surface of the end portion 1a.

DETAILED DESCRIPTION OF THE INVENTION

Figure 1:
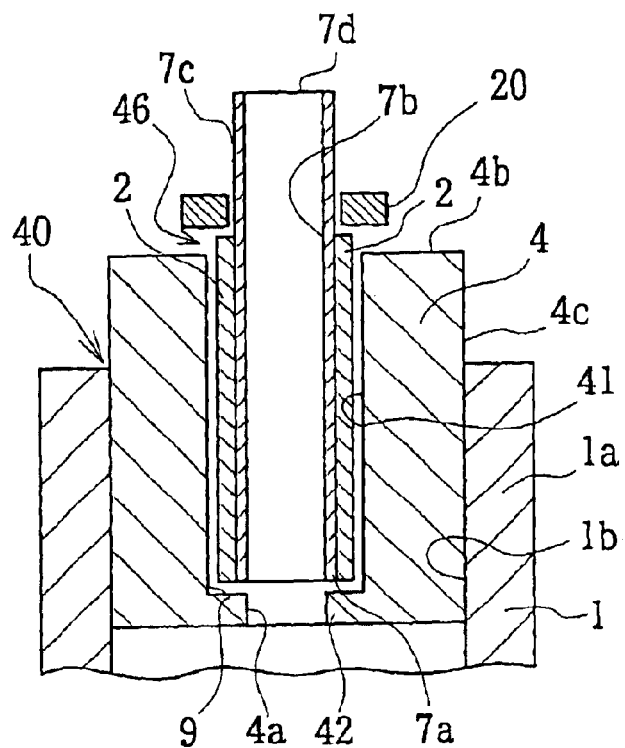
FIG. 1 is a cross sectional view schematically showing the state wherein a porous bone structure 2 is provided between a sealing member 4 and a metal member 7.

FIGS. 1 to 7 are cross sectional views showing an end portion of a high pressure discharge lamp of the invention.

An inner wall surface 1b of an end portion 1a of a ceramic high pressure discharge tube 1 is formed so as to extend straightforwardly in the direction of the central axis of the tube. A part of a sealing member 4 is inserted within an opening 40 of the end portion 1a. 4c is an outer surface and 46 is a through hole of the sealing member 4.

A depression or hollow 9 is formed on the inner wall surface 4a of the sealing member 4. A metal member 7 is held in the hollow 9. In the embodiment, the metal member 7 has a shape of a tube and an opening is formed in its end portion 7d, the opening being sealed after introducing a starter gas and an ionizable light-emitting substance. 7b is an inner surface and 7c is an outer surface of the metal member 7. An inner space of the metal member 7 is commuted with an inner space of the ceramic discharge tube 1 (described below). A protrusion 42 is provided in the sealing member 4 and faces an end portion 7a of the metal member 7.

As shown in FIG. 1, the inventors provided a porous bone structure 2, made of a sintered product of metal powder and with open pores, between the metal member 7 and sealing member 4. A ceramic material ring was then positioned on the bone structure 2. The melting point of the bone structure 2 is adjusted so as to exceed that of the ceramic material.

Figure 2:
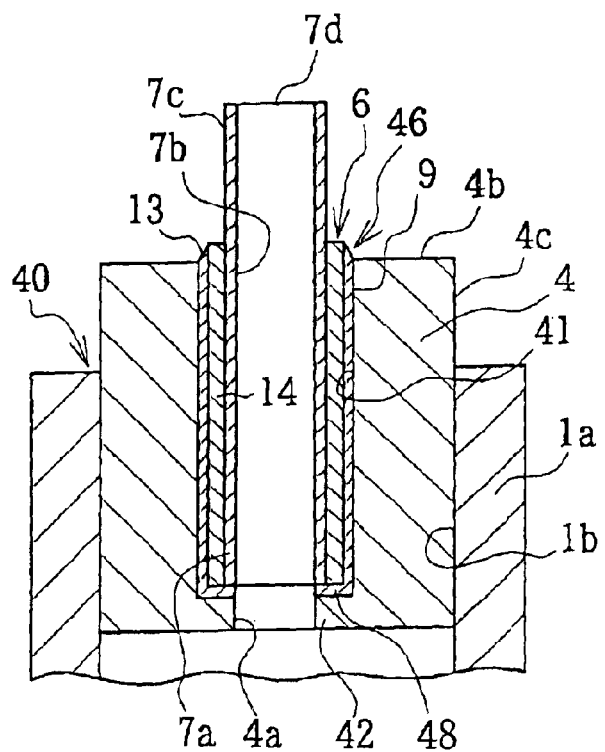
FIG. 2 is a cross sectional view schematically showing a joined body.

When the ceramic material was melted, as schematically shown in FIG. 2, the inventor found that the melted material was impregnated into the open pores to form main phase 14, comprising the porous bone structure and ceramic composition layer impregnated into the open pores. The inventor further found that the thus melted material flowed into the interface of the sealing member 4 and the main phase 14 so that the bone structure slightly floated from the surface of the sealing member 4 to form the intermediate ceramic composition layer 13. The main phase 14 and intermediate ceramic composition layer 13 together form a joining portion 6 joining the metal member 7 and sealing member 4. 41 is a joint interface of the sealing member 4. The joining portion 6 extends to the region near the protrusion 42. A joining ceramic composition layer 48 is formed between the protrusion 42 and the end portion 7a of the metal member 7.

Figure 3:
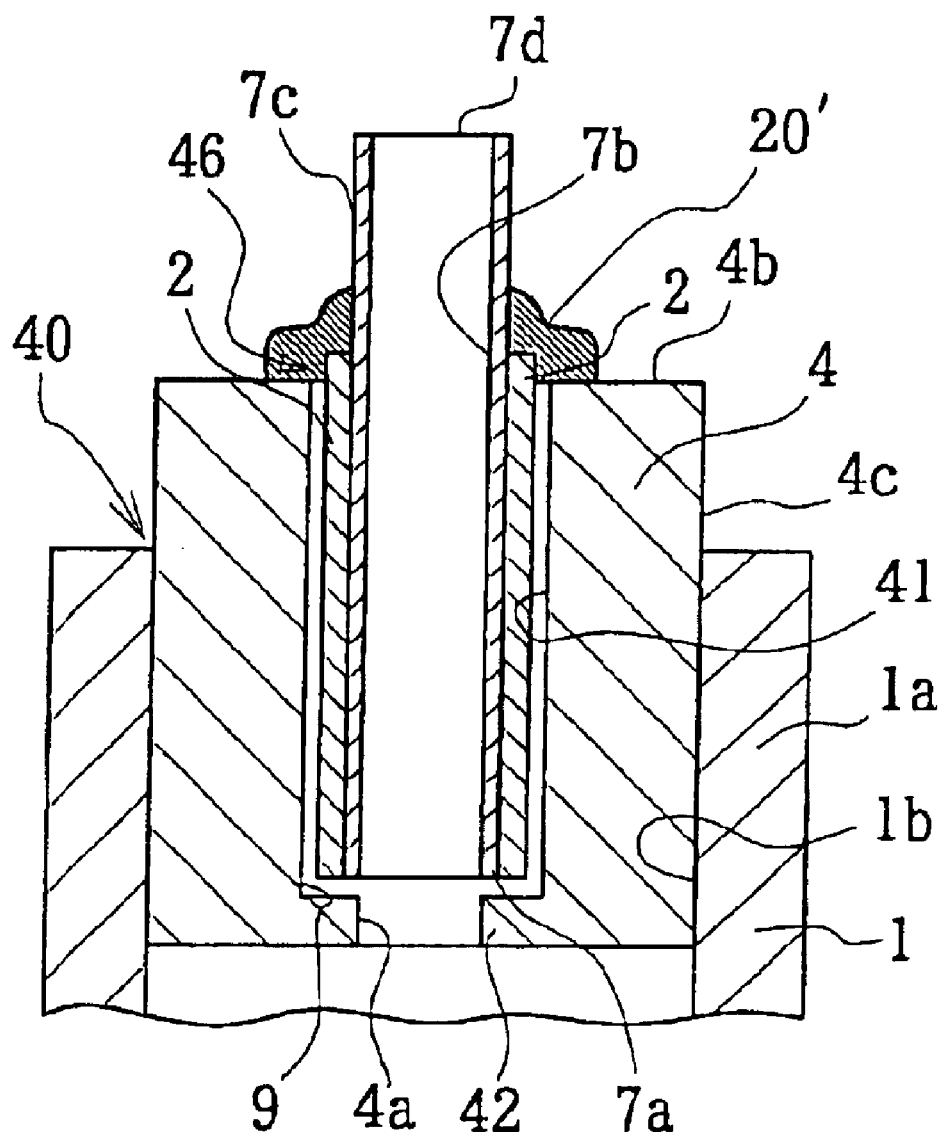
FIG. 3 is a cross sectional view schematically showing the state wherein a porous bone structure 2 is provided between a sealing member 4 and a metal member 7.

As shown in FIG. 3, it is also possible to apply a paste ceramic composition 20' at the peripheral of the metal member 7, the bone structure 2 and the sealing member 4 instead of positioning the ceramic material ring 20 on the bone structure 2.

Figure 4:
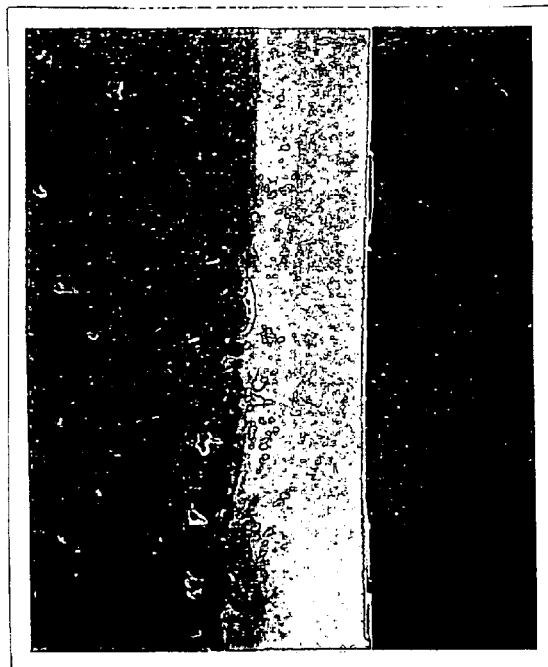
FIG. 4 is an SEM photomicrograph, showing the joint interface between a metal member and a sealing member.
Figure 5:
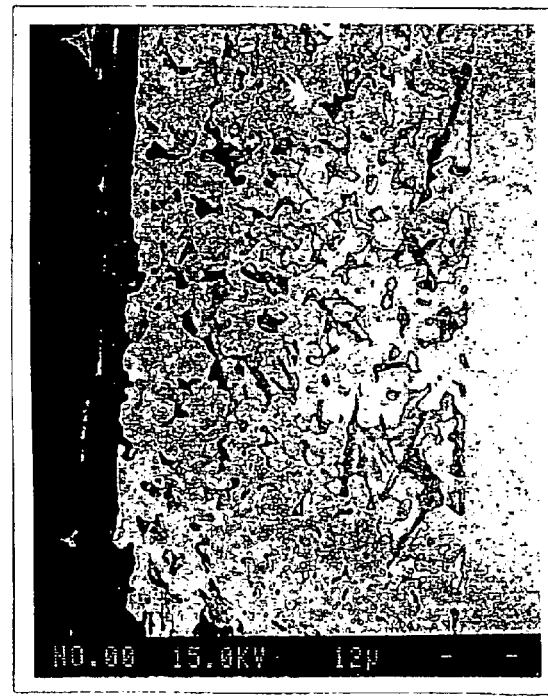
FIG. 5 is a photomicrograph showing an enlarged view of a part of FIG. 4.
Figure 6:
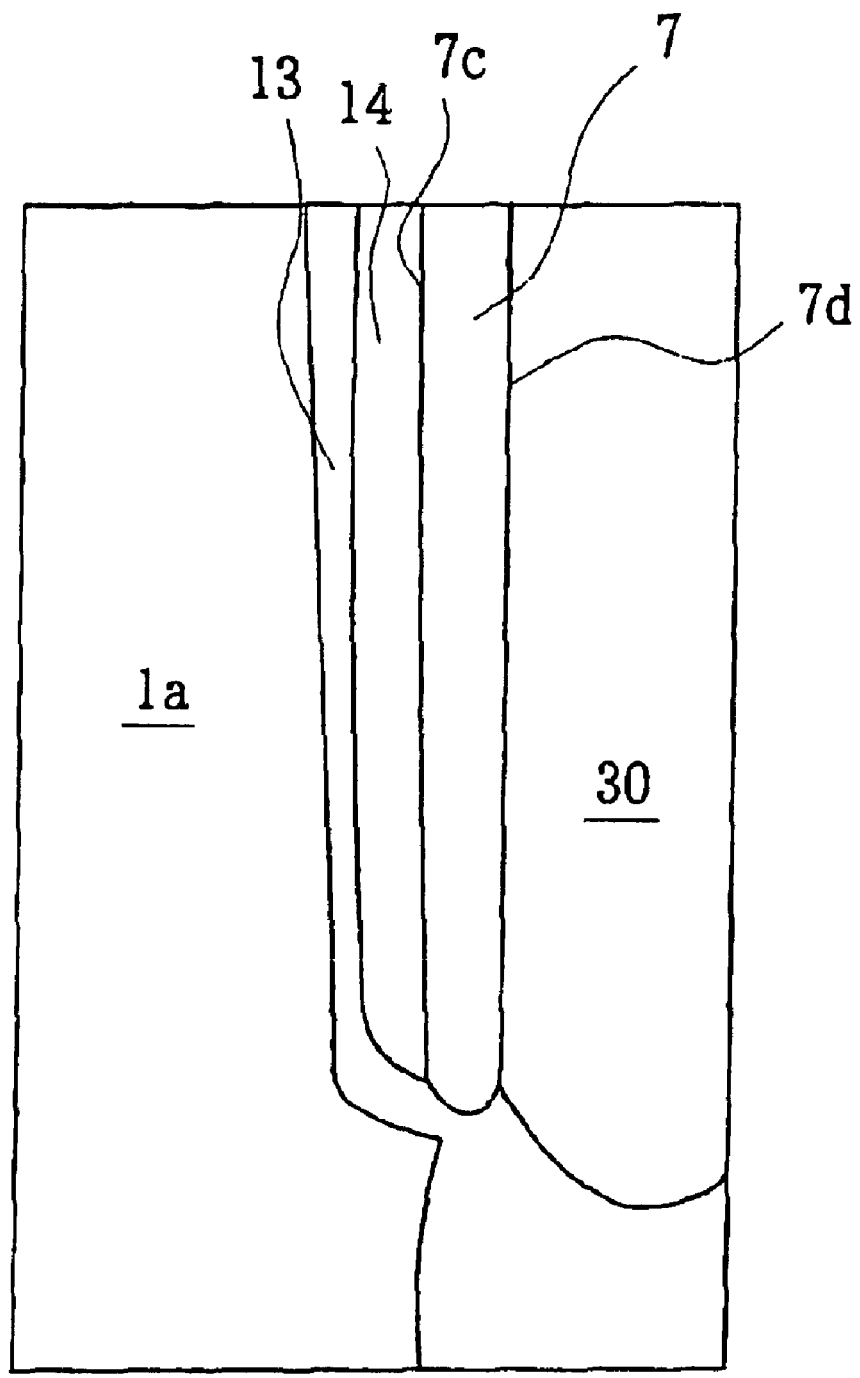
FIG. 6 is a diagram illustrating the photomicrograph of FIG. 4.
Figure 7:
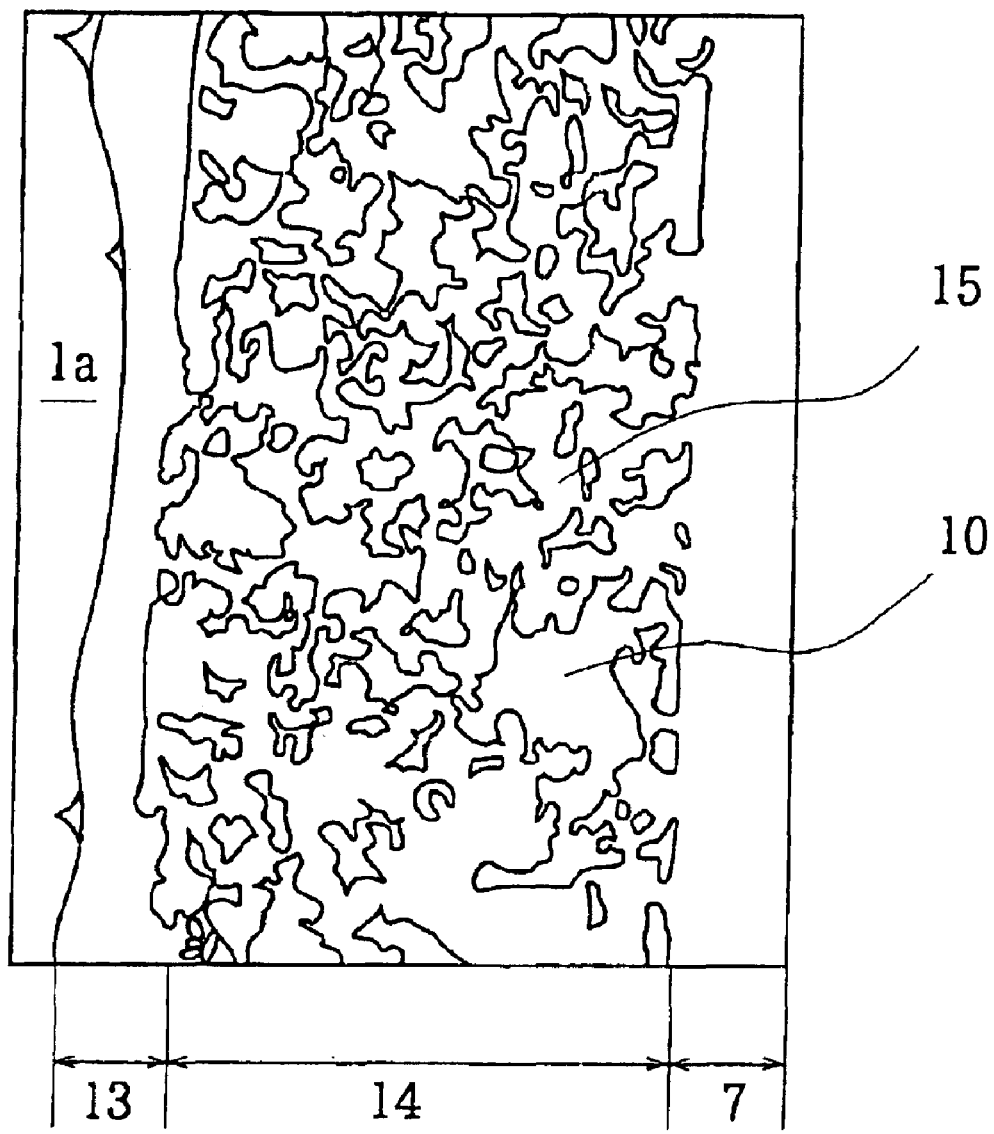
FIG. 7 is a diagram illustrating the photomicrograph of FIG. 5.

Such structure will be explained referring to scanning type microscopic photographs of FIGS. 4 and 5, and line diagrams of FIGS. 6 and 7. FIG. 4 is a photomicrograph showing the region near the interface between the metal member 7 and the sealing member 4, and FIG. 6 is a diagram illustrating the photomicrograph of FIG. 4. FIG. 5 is an enlarged view showing the photomicrograph of FIG. 4, and FIG. 7 is a diagram illustrating the photomicrograph of FIG. 5.

The intermediate ceramic composition layer 13 and main phase 14 is formed on the surface of the sealing member 4. The main phase 14 is composed of the bone structure 15 and the ceramic composition layer 10 impregnated into open pores of the bone structure 15. The intermediate ceramic composition layer 13 is composed of the same composition as the impregnated ceramic composition layer 10. The main phase 14 of the joining portion 6 is formed on the surface of the metal member 7. In the photomicrograph of the FIG. 4, the whitish region in the main phase 14 is metallic molybdenum, and gray or black region in the main phase 14 is the impregnated ceramic composition layer. The difference of the brightness in the impregnated ceramic phase shows that the ratio of the components in the ceramic, such as alumina, has been changed microscopically.

In the joined body having the above structure, tensile stresses on the ceramic are dispersed by means of metal particles (porous bone structure) and compression stress on the bone structure is dispersed by means of the ceramic impregnated into its open pores. That is, the different kinds of materials may cooperate with each other to cope with both of the tensile and compression stresses on the joining portion. Further, it is relatively hard to generate cracks in the ceramic materials. In addition, when cracks develop within the ceramic composition layer, such cracks may be interrupted by the porous bone structure made of a metal, thereby preventing the fracture of the joining portion. Further, such main phase comprising the porous bone structure and impregnated ceramic composition layer adheres to the metal member and the intermediate ceramic composition layer strongly adhere to the sealing member.

Further, ceramic components susceptible to corrosion are mainly impregnated into the open pores of the bone structure.

Figure 8:
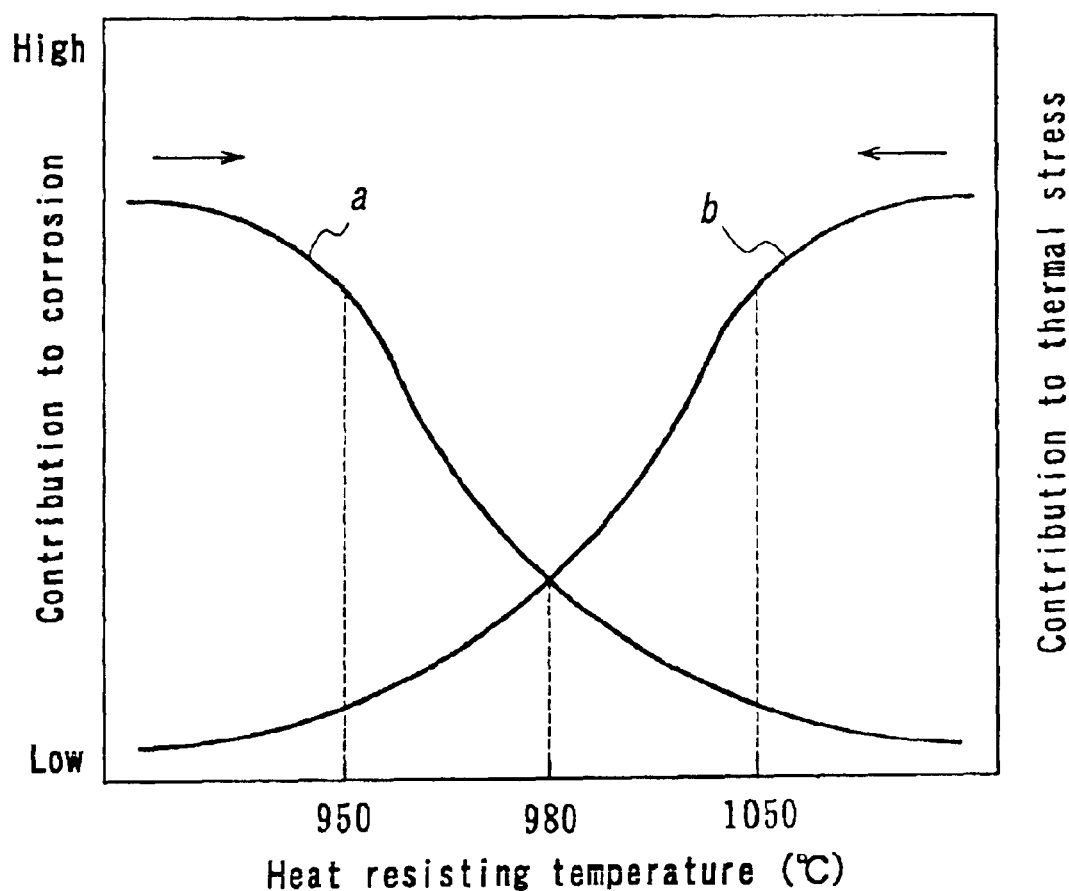
FIG. 8 is a diagram showing the relationship among the heat resisting temperature, the thermal stress, and the corrosion resistance of the high pressure discharge lamp.

According to the present invention, it is found that there are thermal stress factors and the corrosion factors involved in the failure mechanism of the high pressure discharge lamp. It is also found that there is a temperature region in which the thermal stress factor is dominant and the temperature region in which the corrosion factor is dominant. FIG. 8 is a diagram showing the relationship among the heat resisting temperature, the thermal stress, and the corrosion resistance of the high pressure discharge lamp. As shown in FIG. 8, the thermal stress factor is dominant at a heat resisting temperature lower than 980° C., preferably equal to or lower than 950° C., and the corrosion factor is dominant at a heat resisting temperature higher than 980° C., preferably equal to or lower than 1050° C. According to the inventor's investigation, it is advantageous for the high pressure discharge lamp to have not less than 50% of the crystallinity in view of the corrosion.

The above-mentioned phenomenon can be explained as follows. It is thought that the thermal stress is proportional to the difference between the real temperature and the melting point (the softening temperature) of the object. Therefore, as shown by curve a in FIG. 8, the contribution to the thermal stress decreases as the heat resisting temperature increases. Substantial thermal stress does not occur at a temperature equal to or higher than the melting point.

On the other hand, as shown by curve b in FIG. 8, the corrosion (the chemical reaction) decreases as the heat resisting temperature decreases. This is because the activity of ionizable light-emitting material filled into the discharge tube decreases with the temperature of the discharge tube, and thus, attacks on the inner wall of the discharge tube and so on decrease. Therefore, at a relatively high temperature, the chemical stabilization of the high pressure discharge lamp increases as the rate of the crystallinity increases.

Figure 9:
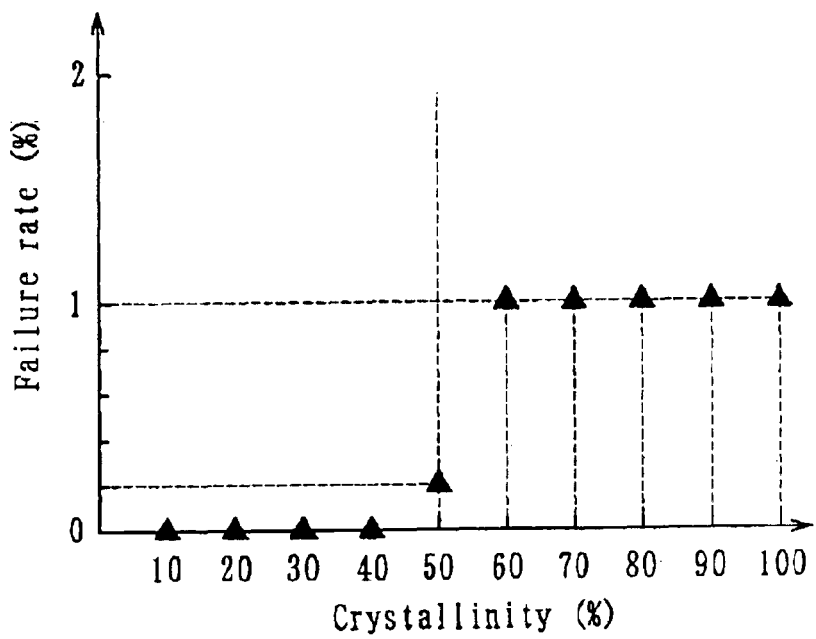
FIG. 9 is a diagram showing the relationship between the crystallinity and the failure rate of a ceramic discharge tube during the thermal cycle test under the temperature of 950° C.

When the thermal cycle test of the ceramic discharge tube is performed at 950° C., the temperature in which the thermal stress is dominant in the failure mechanism of the high pressure discharge lamp, the stress relaxation mechanism fully acts and the corrosion is relatively low on condition that the intermediate ceramic composition layer and the impregnated ceramic composition layer of the high pressure discharge lamp has a crystallinity of not more than 50%. This is because the thermal stress is dominant in the failure mechanism of the high pressure discharge lamp when the crystallinity is not more than 50%. As a result, failure of the high pressure discharge lamp does not occur. On the other hand, it is not advantageous for the high pressure discharge lamp to have not less than 50% of the crystallinity because the stress relaxation mechanism does not fully act (refer to FIG. 9). In the thermal cycle test, thermal cycles were performed. In this case, the temperature of the high pressure discharge lamp was firstly maintained at the room temperature for 15 minutes, subsequently was increased to 1050° C. and maintained at 1050° C. for 5 minutes, and finally was decreased to the room temperature for every thermal cycle.

Figure 10:
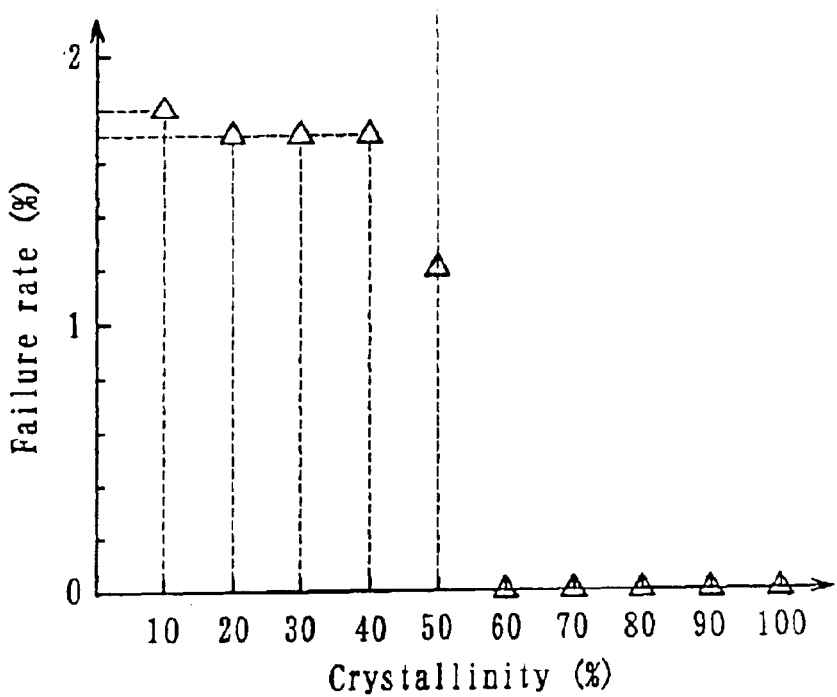
FIG. 10 is a diagram showing the relationship between the crystallinity and the failure rate of a ceramic discharge tube during the thermal cycle test under the temperature of 1050° C.

When the thermal cycle test of the ceramic discharge tube is performed at 1050° C., the temperature in which the corrosion is dominant in the failure mechanism of the high pressure discharge lamp, the corrosion resistance fully acts and the thermal stress is relatively low on condition that the intermediate ceramic composition layer and the impregnated ceramic composition layer of the high pressure discharge lamp has a crystallinity of more than 50%. As a result, failure of the high pressure discharge lamp does not occur. On the other hand, it is not advantageous for the high pressure discharge lamp to have not more than 50% of the crystallinity because the corrosion resistance does not fully act (refer to FIG. 10).

The following table shows the results in which cubes were arranged into a quartz tube and exposed to $DyI_3$ and $ScI_3$ for 4000 hours at the temperature of 950° C. Each of the cubes has 5 mm of sides and is composed of ceramic compositions of 46%, 54% and 75% of the crystallinity.

TABLE 1

| | rare earth metal halide (wt %) | | | | | |
|---|---|---|---|---|---|---|
| crystallinity (%) | 0 | 5 | 10 | 15 | 20 | 40 |
| 46 | ☆ | ⊙ | ○ | Δ | Δ | Δ |
| 54 | ☆ | ☆ | ⊙ | ⊙ | ○ | ○ |
| 75 | ☆ | ☆ | ☆ | ⊙ | ⊙ | ⊙ |

☆: less than 5% of the corrosion region
⊙: 5 to 20% of the corrosion region
○: 20 to 30% of the corrosion region
Δ: 30 to 40% of the corrosion region As already stated, when the heat resisting temperature is higher than 980° C., or the crystallinity is more than 50%, the contribution to the corrosion resistance is higher than that to the relaxation of the thermal stress. On the other hand, when the heat resisting temperature is lower than 980° C., or the crystallinity is less than 50%, the contribution to the relaxation of the thermal stress is higher than that to the corrosion resistance. However, If the ionizable light-emitting material contains a main component of a rare earth metal halide, it is prefer to have more than 50% of the crystallinity regardless of the heat resisting temperature because the contribution to the corrosion is relatively high at the temperature lower than 980° C. due to the high corrosion thereof. The "main component" herein means a component of an ionizable light-emitting material occupying not less than 15 weight percent of the ionizable light-emitting material except for a starting medium.

According to the present invention, the heat resisting temperature is 1050° C. if the crystallinity is 55%. As a result, the present invention can be applied to not only a lamp for general lighting but also a head lamp for vehicle which requires the relatively high heat resisting temperature not less than 1000° C. and a severe heat resisting cycle.

The joined body in the present invention is particularly suitable to a high pressure discharge lamp. In this case, such high pressure discharge lamp may be extremely stable to repeated cycles of turning-on and turning-off and a corrosive gas contained within the inner space of a ceramic discharge tube.

In the invention, preferably, an intermediate ceramic composition layer and impregnated ceramic composition layer have the substantially same kind of composition. This means that both belong to the same ingredient system as a whole, thereby improving the strength of the joining portion. The intermediate ceramic composition layer and the impregnated ceramic composition layer further preferably have substantially same composition. This means that the intermediate ceramic composition layer and the impregnated ceramic composition layer are derived from the same material.

The degree of crystallization of the intermediate ceramic composition layer and the impregnated ceramic composition layer is not limited, but may preferably be 80% or more. In such a case, the maximum degree is not limited, and may be 100%.

In order to examine the relationship between the rate of the crystallinity and that of the corrosion, cubes were arranged into a quartz tube and exposed to $DyI_3$ and $ScI_3$ for at the temperature of 1000° C., each of the cubes having 5 mm of sides and being composed of ceramic compositions of 60%, 70% and 80% of the crystallinity. The results are shown as follows.

TABLE 2

| crystallinity (%) | time | | | | |
|---|---|---|---|---|---|
| | 1000 | 2000 | 3000 | 4500 | 6000 |
| 60 | ☆ | ◉ | ○ | Δ | Δ |
| 70 | ☆ | ◉ | ○ | ○ | Δ |
| 80 | ☆ | ◉ | ◉ | ◉ | ◉ |

☆: less than 5% of the corrosion region
◉: 5 to 20% of the corrosion region
○: 20 to 30% of the corrosion region
Δ: 30 to 40% of the corrosion region As shown in table 2, the corrosion increases as the rate of the crystallinity increases. In other words, the corrosion at 70% of the crystallinity is higher than that at 60% of the crystallinity, and the corrosion at 80% of the crystallinity is higher than that at 70% of the crystallinity. Especially, when the crystallinity is 80%, the corrosion can be not more than 20% even if the time to expose the cube reaches 6000 hours.

Each of ceramic materials constituting the intermediate ceramic composition layer and ceramic constituting the impregnated ceramic composition layer may preferably comprise one or more oxide selected from the group consisting of $Al_2O_3$, $Sc_2O_3$, $Y_2O_3$, $La_2O_3$, $Gd_2O_3$, $Dy_2O_3$, $H_2O_3$, $Tm_2O_3$, $SiO_2$, $MoO_2$ and $MoO_3$. A mixture of not less than two of the oxides may be particularly preferable. A $Dy_2O_3$—$Al_2O_3$, $Sc_2O_3$—$Al_2O_3$ two eutectic component is more preferable because it has substantially high melting point on the order of 1800° C.

Figure 11:
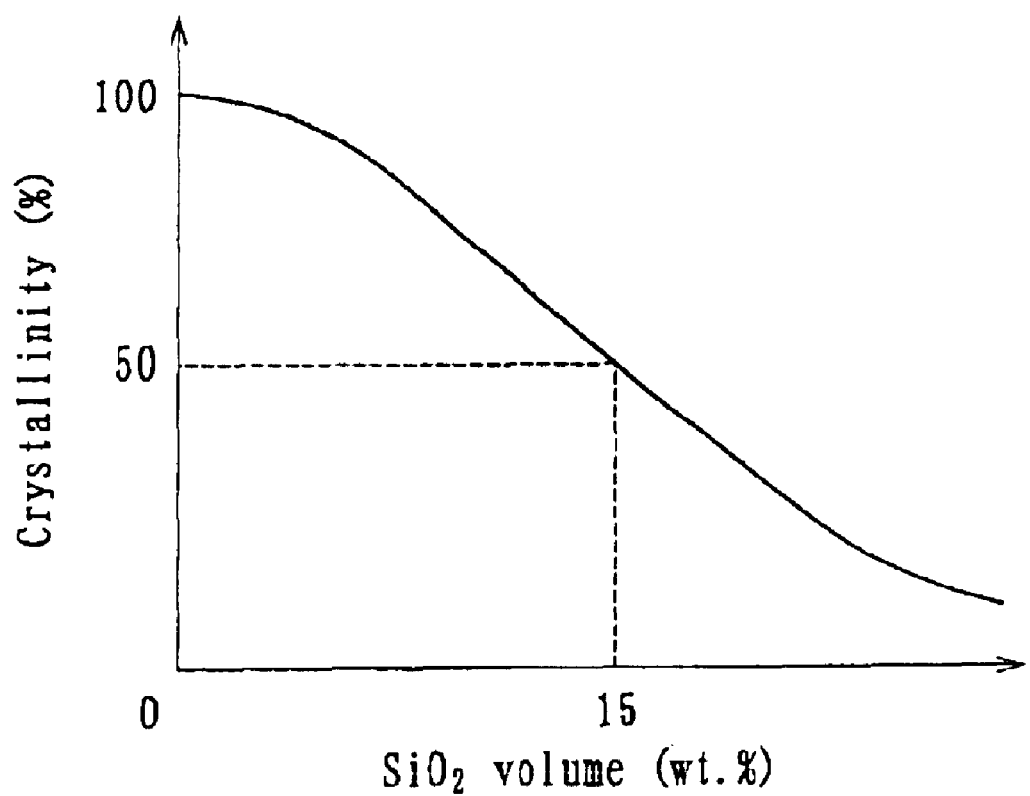
FIG. 11 is a diagram showing the relationship between the weight % of $SiO_2$ and the crystallinity of a ceramics.

To prevent corrosion caused by the corrosive gas contained within the high pressure discharge lamp over a long term, the composition of $SiO_2$ in each ceramic, which is a relatively corrosive ingredient, may preferably be 15 weight percent or less, and more preferably 5 weight percent or less. As a result, it is possible to control the crystallinity of the ceramics well. FIG. 11 is a diagram showing the relationship between the weight % of $SiO_2$ and the crystallinity of a ceramics. It shows the relationship when it takes 15 minutes to decrease 500° C. from the treatment temperature. As shown in FIG. 11, the crystallinity is not less than 50% when a content of $SiO_2$ in the ceramics is less than 15 weight percent.

$SiO_2$ also act as a kind of binder to retain the shape of the ceramic material when this joined body is produced. Therefore, in view of improving the shape retaining character, $SiO_2$ may preferably be contained in 5 ppm or more, and more preferably 20 ppm or more.

Each ceramic may preferably contain particularly $Al_2O_3$. In view of wettability, each ceramic may preferably contain a main component of the ceramic or cermet constituting the second member. The "main component" herein means a ceramic component constituting 70 weight percent or more of the ceramic or a ceramic component constituting 60 weight percent or more of the cermet.

The following are the preferred composition ranges.
(1) $Al_2O_3$ 10 to 80 weight percent
  $Si_2O_2$ 10 weight percent or less (preferably 5 ppm or more)
  $Y_2O_3$ 0 to 40 weight percent
  $Dy_2O_3$ 0 to 50 weight percent
  $B_2O_3$ 0 to 10 weight percent
  $MoO_3$ 0 to 10 weight percent
(2) $Al_2O_3$ 10 to 80 weight percent
  $SiO_2$ 0 to 10 weight percent
  $Y_2O_3$ 10 to 25 weight percent
  $Dy_2O_3$ 10 to 50 weight percent The metal member may be made of one or more metal selected from the group consisting of molybdenum, tungsten, rhenium, niobium, tantalum and alloys thereof.

Among them, niobium and tantalum have thermal expansion coefficients matching with that of a ceramic, especially alumina ceramic, constituting a ceramic discharge tube. However, it is known that niobium and tantalum are susceptible to corrosion to a metal halide. Therefore, it is desirable to form a metal member by a metal selected from the group consisting of molybdenum, tungsten, rhenium and alloys thereof, for improving the life of the metal member. However, such metals, with high resistance to a metal halide, generally have a low thermal expansion coefficient. For example, alumina ceramic has a thermal expansion coefficient of $8 \times 10^{-6} K^{-1}$, molybdenum has that of $6 \times 10^{-6} K^{-1}$, and tungsten and rhenium have those of not more than $6 \times 10^{-6} K^{-1}$. In such a case, as described above, the inventive joined structure effectively reduces the stress due to the difference of the thermal expansion coefficients of the metal member and the ceramic discharge tube or the sealing member.

Molybdenum is suitably used for the invented structure for the advantage that it has high resistance to a metal vapor, particularly to a metal halide gas, and that it has high wettability to a ceramic.

When using molybdenum as a material of a metal member, at least one of $La_2O_3$ and $CeO_2$ may preferably be added to molybdenum in a ratio of 0.1 to 2.0 weight percent as a total.

The porous bone structure is made of a sintered product of metal powder. The metal powder may preferably be made of a metal selected from the group consisting of molybdenum, tungsten, rhenium, niobium, tantalum and the alloys thereof. For further improving the resistance of the structure to a halogen, a metal selected from the group consisting of molybdenum, tungsten, rhenium and the alloys thereof is particularly preferable.

The main components of the metals constituting the metal member and constituting the porous bone structure may preferably be the same and more preferably molybdenum.

Such (main component) means that the component constitutes not lower than 60 weight percent of the metal.

The porous bone structure may preferably has a porosity, of open pores, of not lower than 15%, and more preferably not lower than 40%, thus improving the strength of the joining portion. The porosity may preferably be not higher than 80%, and more preferably be not higher than 70%, thus effectively impregnating the ceramic into the open pores of the bone structure and dispersing the stress applied on the structure to improve the resistance thereof to repeated thermal cycles.

The second member or sealing member is made of a ceramic or cermet. The ceramic may preferably be a ceramic alone, selected from the group consisting of alumina, magnesia, yttria, lanthania and zirconia, or the mixed compound thereof.

More particularly, the sealing member may be made of the same or the different kinds of material as that of the ceramic discharge tube. When the electrical conductor is made of niobium or tantalum, the ceramic discharge tube and sealing member may preferably be made of the same kind of material, because in this case the thermal expansion coefficient of the electric conductor is approaching those of the ceramic discharge lamp and sealing member. The phrase "same kind of material" means that their base components of the ceramic materials are the same and the added component or components may be the same or different with each other.

When the metal member is made of molybdenum, tungsten, rhenium or the alloys thereof, the difference of the thermal expansion coefficients of the ceramic discharge tube and metal member are relatively increased. Therefore, it is preferable to adjust the thermal expansion coefficient of the sealing member between those of the electric conductor and the end portion of the ceramic discharge tube. For that reason, the sealing member may be formed of a cermet.

A cermet is a composite material of a ceramic and a metal. Such ceramic may preferably be a ceramic alone, selected from the group consisting of alumina, magnesia, yttria, lanthania and zirconia, or the mixed compound thereof, and more preferably be the same kind of ceramic as that of the ceramic discharge tube, thereby making it possible to co-fire the ceramic discharge tube and sealing member simultaneously. In view of this, the ceramic components of the ceramic discharge tube and the cermet may more preferably be alumina ceramic.

The metal component of the cermet may preferably be a metal, having a high temperature melting point and resistance to a metal halide, such as tungsten, molybdenum, rhenium or the like, or the alloys thereof, thus giving the sealing member improved resistance to the metal halide. The cermet may preferably has not lower than 55 weight percent, and more preferably not lower than 60 weight percent, of a ceramic component (the balance is a metal component).

Preferably, each material constituting the intermediate ceramic composition layer and the ceramic constituting the impregnated ceramic composition layer have a melting point not more than a temperature subtracted 200° C. from the melting point of the ceramic or the cermet constituting the second member. Thereby, grain boundary cracking seldom occurs in the second member. In this case, the melting point of each materials is not less than 1500° C.

The above-described joining method may be applied to both ends of a ceramic tube. However, in one end, it is necessary to apply a tubular-shaped metal member for introducing an ionizable light-emitting substance through the inner space of the metal member. In the other end, metal members with various shapes such as a rod, a tube or the like may be applied.

The shape of a ceramic discharge tube is not particularly limited, and includes a tube, a cylinder, a barrel or the like. When the metal member is a tubular shaped member supporting an electrode system, through which an ionizable light-emitting substance is introduced into the inner space of the discharge tube, the electrode-system-supporting member is sealed by laser welding or TIG welding. When using laser welding, for example, Nd/YAG laser is used. In this case, a clearance between the metal member and an electrode to be inserted into the metal member is between 30 to 150 $\mu$m at a diameter direction because, if the clearance is too wide, there is a tendency to accumulate the light-emitting material in the clearance so that the unevenness of the property increases, on one hand, and if the clearance is too small, the electrode system substantially contacts the electrode-system-supporting member and the thermal stress of the joining portion thereof increases so that there is a tendency to break the joining portion, on the other hand.

In the case of a metal halide high pressure discharge lamp, an inert gas, such as argon, a metal halide and optionally mercury is introduced into the inner space of the ceramic discharge tube.

FIGS. 1, 2, 3, 12, 13 and 14 show the embodiments of the end portions of the lamp to which the invention is applied.

A joining portion 6 of the invention is interposed between a sealing member 4 and a metal member 7 to join them with each other and to secure air-tightness.

Figure 12:
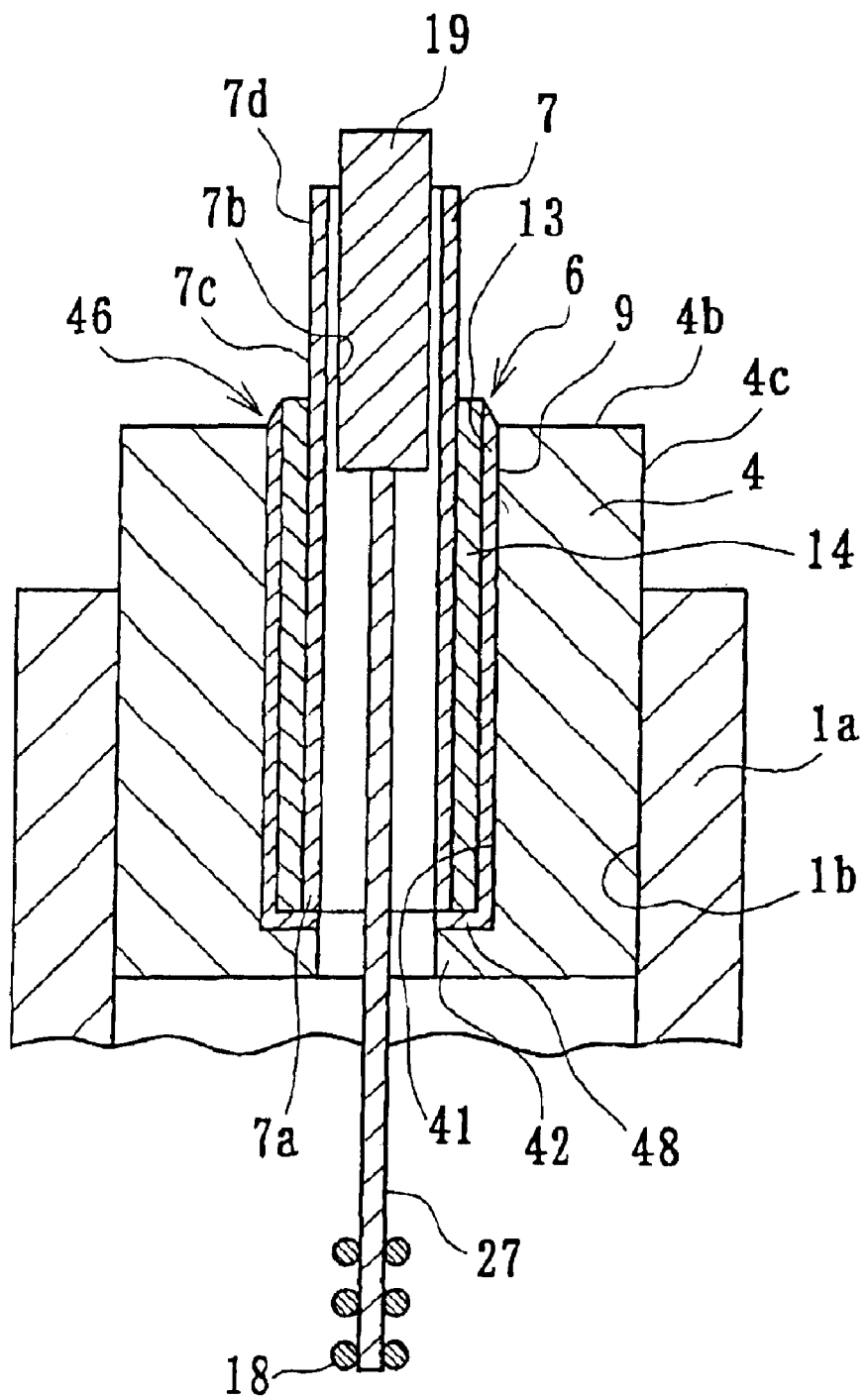
FIG. 12 is a diagram schematically showing a layered structure of the joining portion of the joined body of FIG. 1 and the thermal coefficients of the layers.
Figure 13:
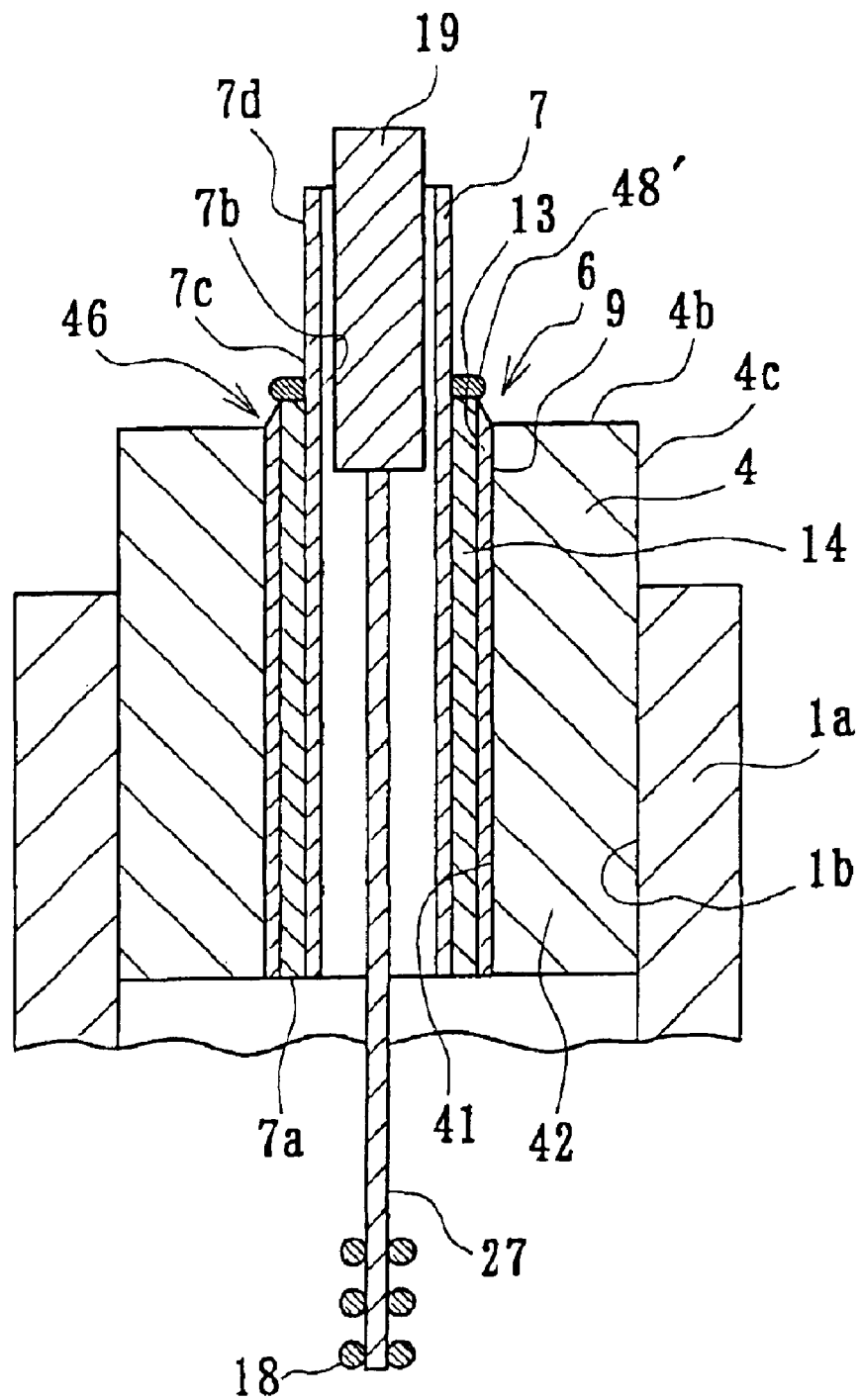
FIG. 13 is a cross sectional view showing the state wherein a clogging member 19 is inserted within the metal member 7 of the high pressure discharge lamp of FIG. 1.
Figure 14:
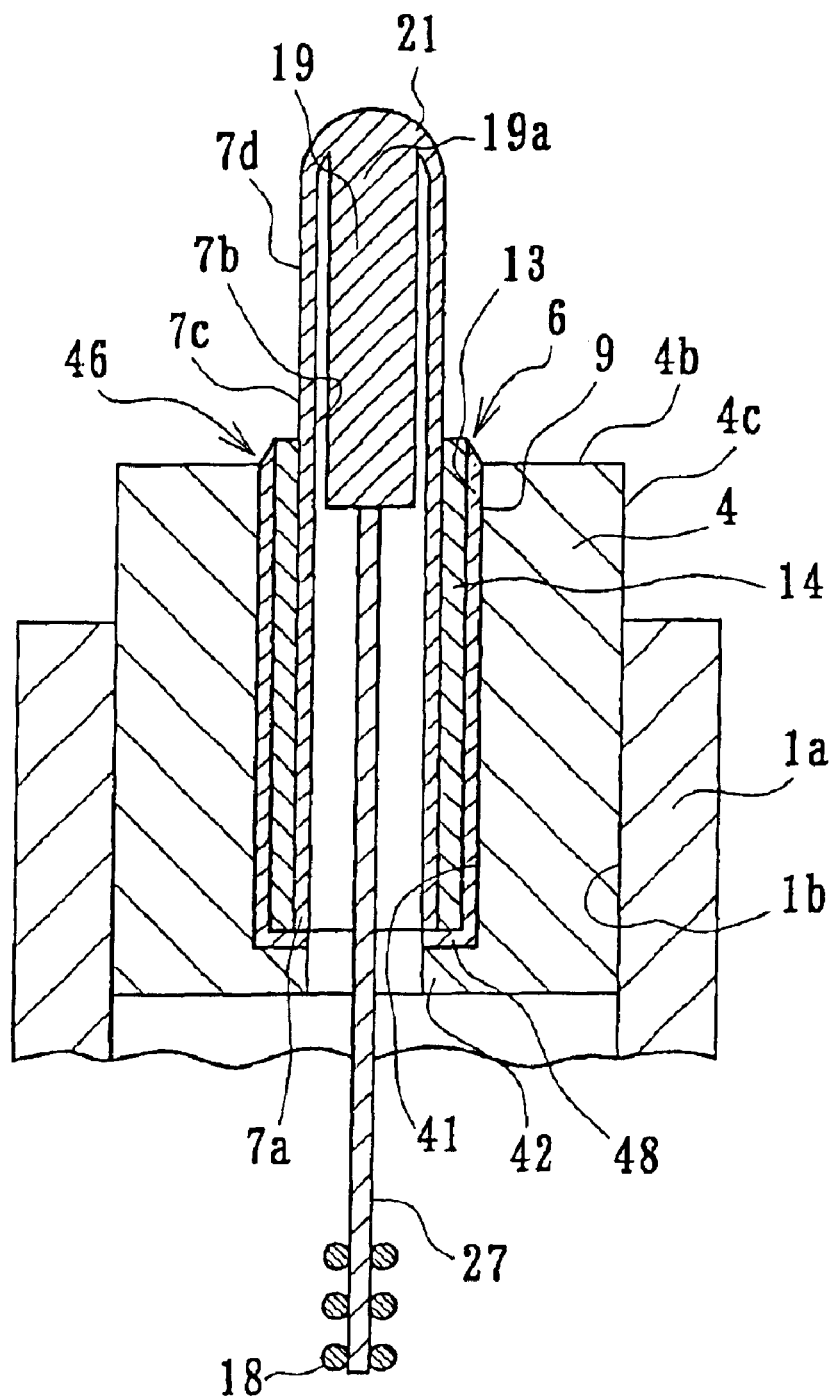
FIG. 14 is a cross sectional view showing a high pressure discharge lamp after the metal member 7 of FIG. 12 and a sealing member 19 is joined to form a sealing portion 21.

As shown in FIG. 12, an axis 27 of an electrode system 18 is attached to a clogging member 19 (preferably made of a metal), the electrode system 18 is inserted into the inner space of a ceramic discharge tube and the clogging member 19 is inserted into the inner space of the metal member 7. As shown in FIG. 13, it is possible to expose a metal end 7a to an inner space of the metal member 7 of the ceramic discharge tube and provide a stopper 48'. As shown in FIG. 14, an end portion 19a of the clogging member 19 is joined, by means of the above welding or the like, to the metal member 7 to form a sealing portion 21, thereby sealing an ionizable light-emitting substance and a starter gas in the inner space of the ceramic discharge tube from the outer atmosphere and providing an electric power to the electrode system 18 through the clogging member 19. A protrusion 42 functions to position the metal member 7 and to make flow path of the corrosive gas longer.

Figure 15:
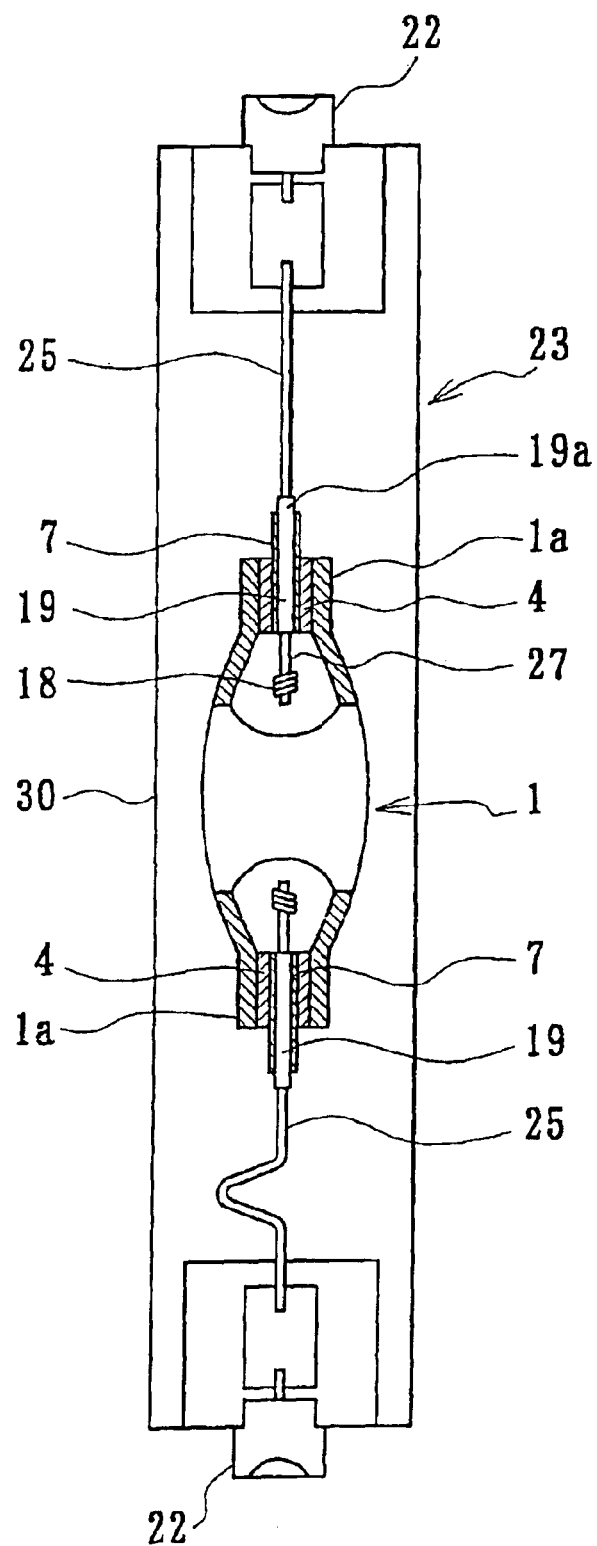
FIG. 15 is a diagram schematically showing an example of a high pressure discharge lamp.

FIG. 15 is a diagram schematically showing an embodiment of a high pressure discharge lamp. A high pressure discharge lamp system 23 has an outer tube 30 generally made of a hard glass, in which a high pressure discharge lamp 1 is contained. The outer tube 30 has both ends sealed with ceramic caps 22. Each clogging member 19 is inserted into and joined with each metal member 7. An outer lead wire 25 is connected with each outer end 19a of each clogging member 19.

Figure 16:
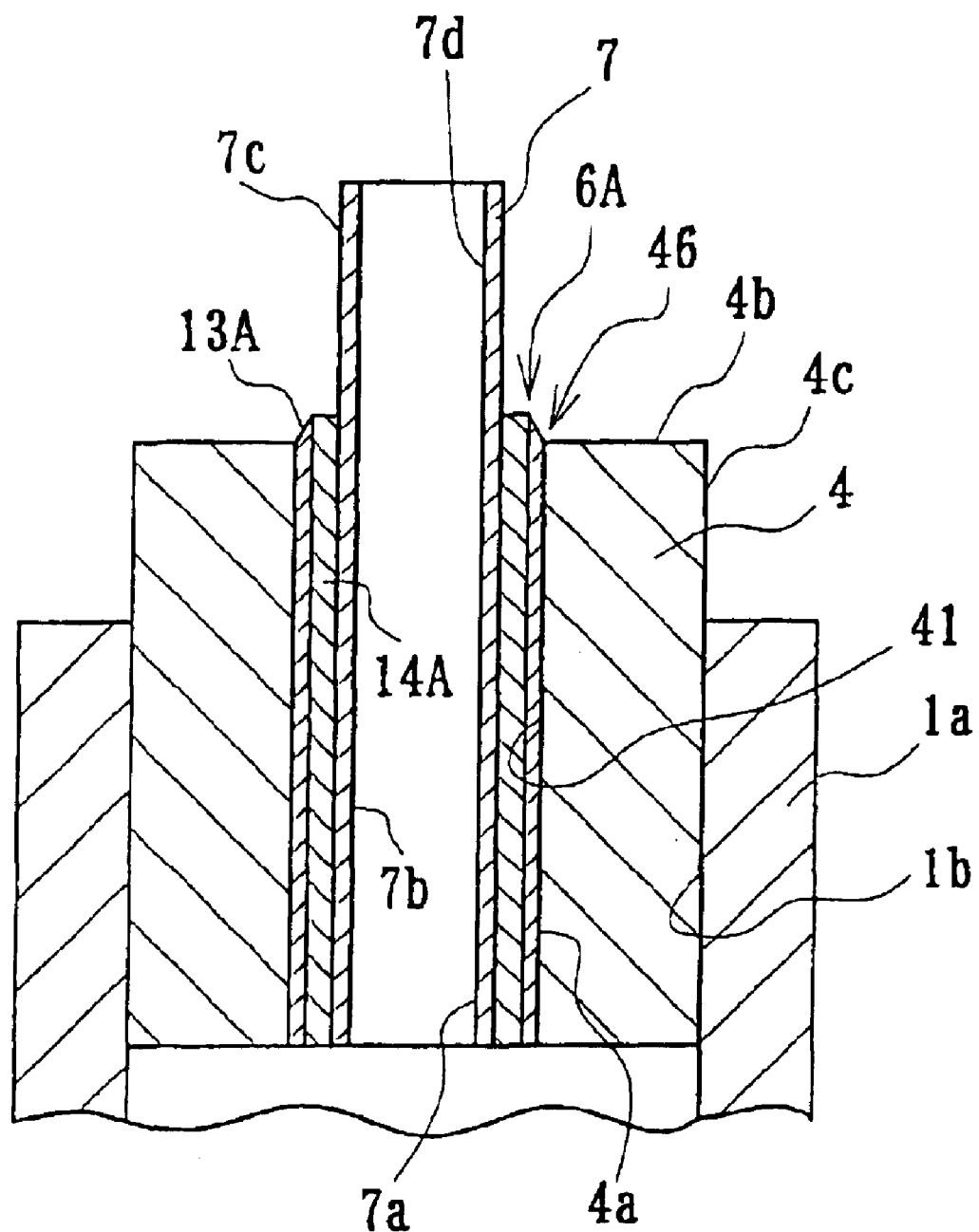
FIG. 16 is a cross sectional view schematically showing an embodiments of an end portion of a high pressure discharge lamp according to the invention, wherein a metal member 7 is joined to the inner wall surface of a sealing member 4 substantially along the full length of the wall.

In the embodiment shown in FIG. 16, the sealing member 4 has no protrusion on its inner wall surface. And, the metal member 7 and the inner wall surface of the sealing member 4 is joined substantially along the full length of the through hole 46 of the sealing member 4. 6A is a joining portion, 13A is an intermediate glass layer and 14A is main phase.

Figure 17:
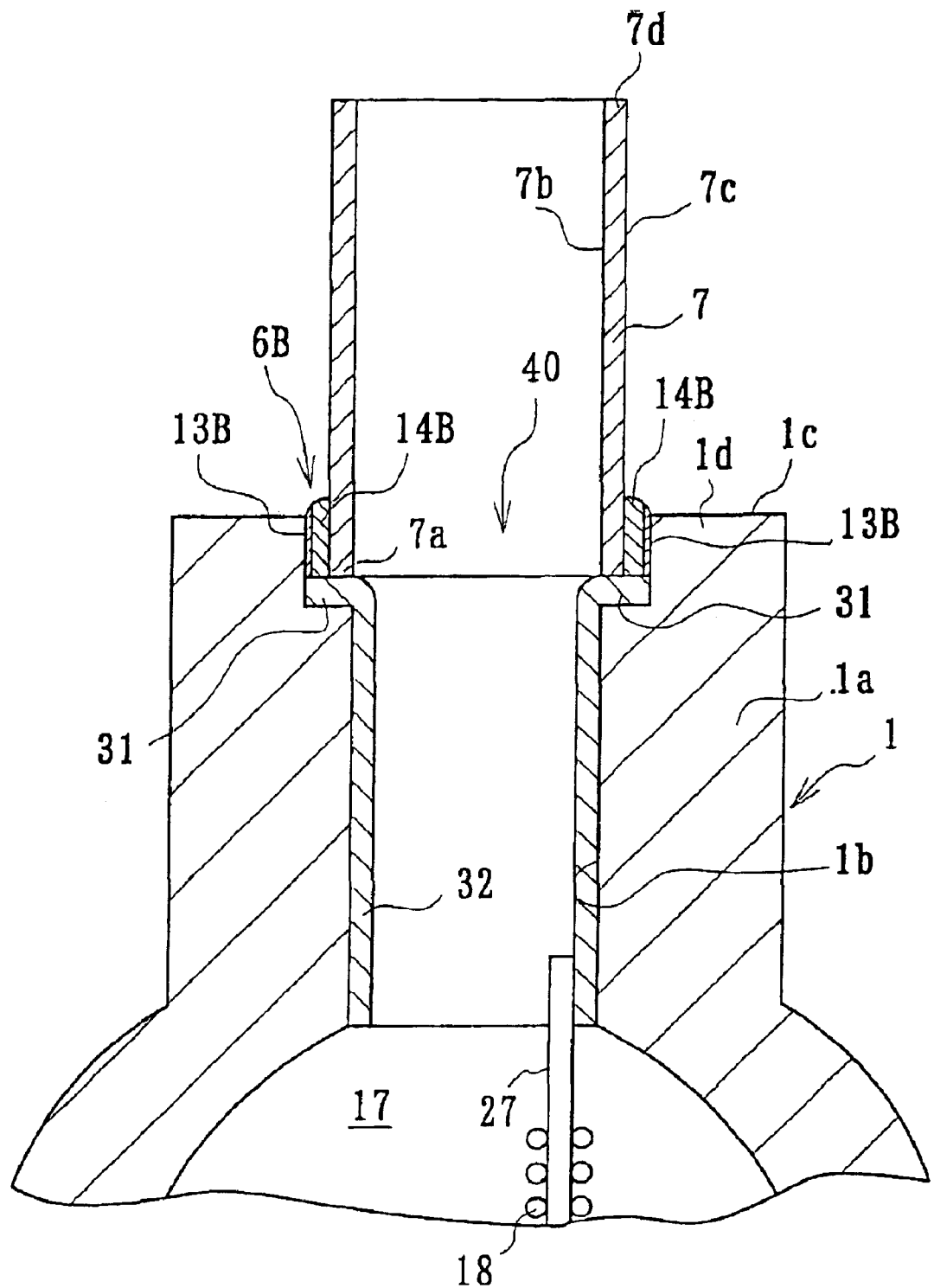

In the embodiment shown in FIG. 17, the inner wall surface 1b of the end portion 1a of the ceramic discharge tube 1 extends straightforwardly in the direction of the main axis of the ceramic discharge tube. A hollow 31 is formed in the end portion 1d of the inner wall surface 1b of the end portion 1a. An end portion 7a of a metal member 7 is supported in the hollow 31. A joining portion 6B is interposed between the discharge tube 1 and the metal member 7 and join them with each other in the hollow 31 to secure the air-tightness. 32 is a metallized layer.

Figure 18:
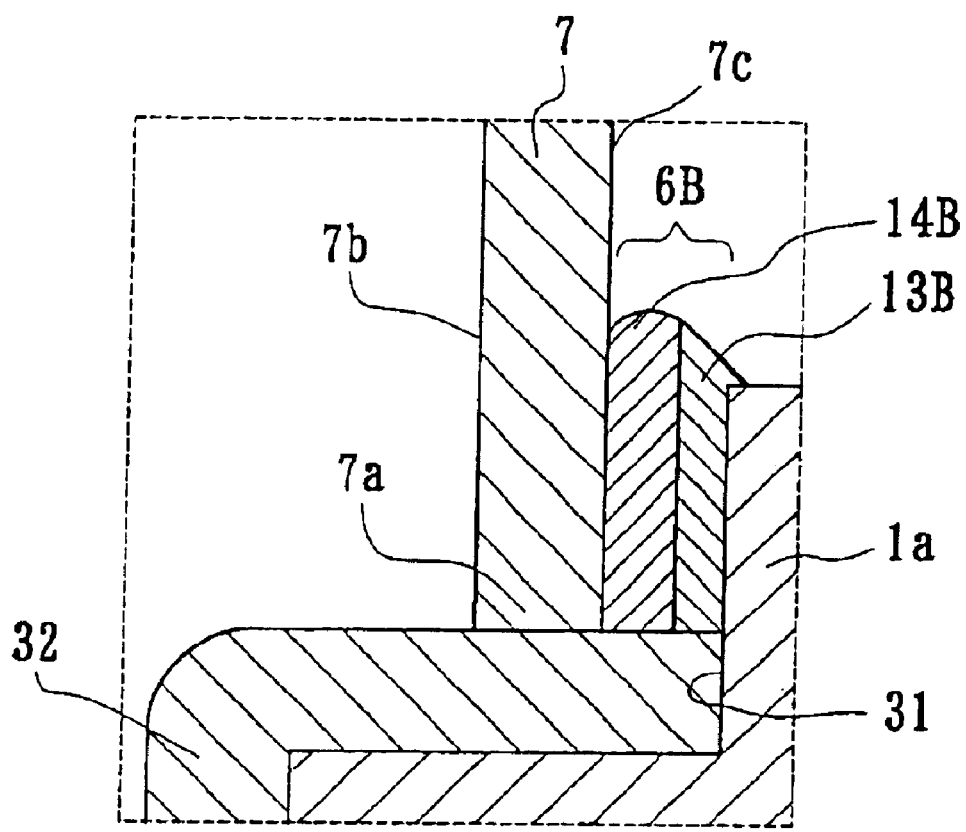
FIG. 18 is an enlarged view showing the region near a hollow 31 shown in FIG. 17.

FIG. 18 is an enlarged view of the region near the hollow 31 shown in FIG. 17. The joining portion 6B comprises main phase 14B contacting the metal member 7 and an intermediate ceramic composition layer 13B contacting the discharge tube 1. The metallized layer 32 covers the inner wall surface 1b of the end portion 1a of the discharge tube 1, further covers the surface of the hollow 31, contacts the edge of the end portion 7a of the metal member 7 and extends to the edge of the joining portion 6B.

Figure 19:
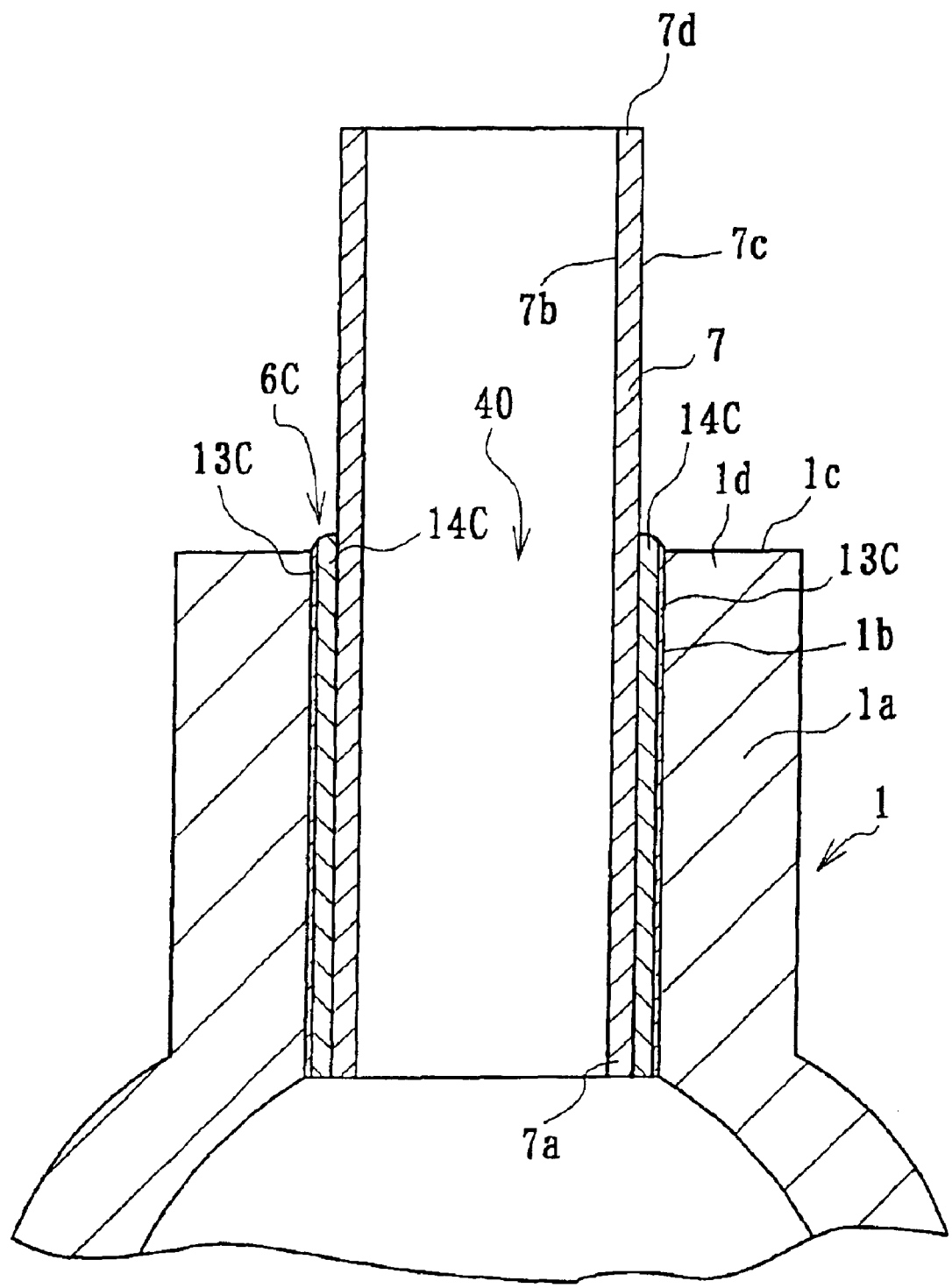
FIG. 19 is a cross sectional view schematically showing an end portion of a high pressure discharge lamp according to another embodiment of the invention, wherein a metal member 7 is joined to an inner wall surface of the end portion 1a of a discharge tube 1 substantially along the full length of the surface.

The embodiment of FIG. 19 have no protrusion on the inner wall surface 1b of the end portion 1a of the discharge tube 1 and the inner wall surface 1b extends substantially straightforwardly. The inner wall surface 1b of the end portion 1a and the metal member 7 are joined with each other substantially along the full length of an opening 40 of the end portion 1a. 6C is a joining portion, 13C is an intermediate ceramic composition layer and 14C is main phase.

Figure 20:
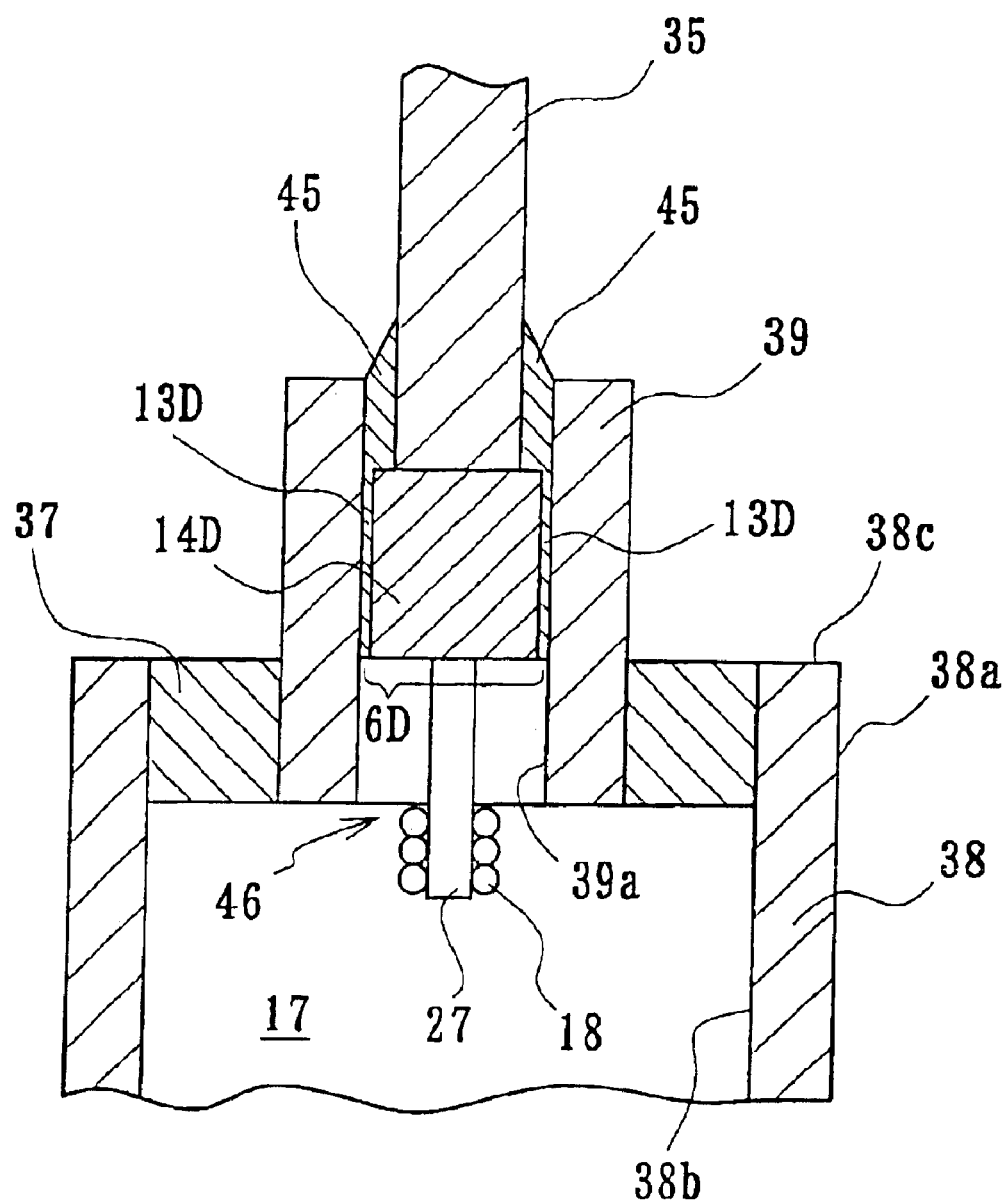
FIG. 20 is a cross sectional view schematically showing an end portion of a high pressure discharge lamp according to another embodiment of the invention, wherein a through hole 46 of a sealing member 39 is sealed by a joining portion 6D of the invention.
Figure 21:
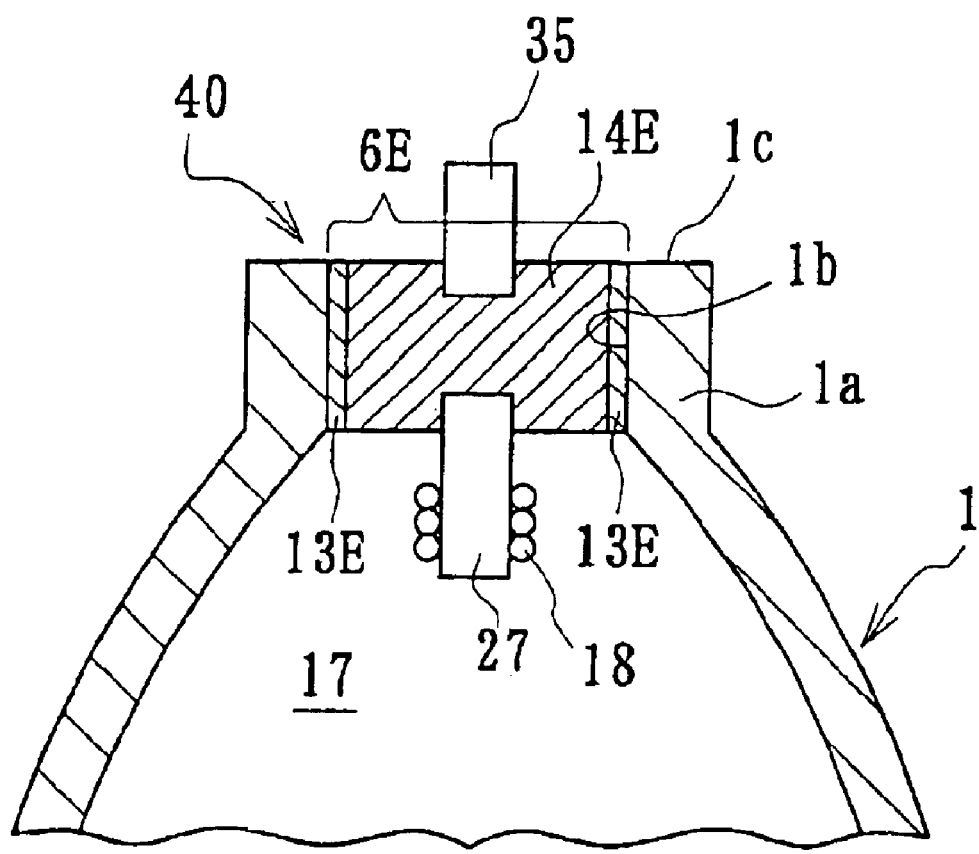
FIG. 21 is a cross sectional view schematically showing an end portion of a high pressure discharge lamp according to another embodiment of the invention, wherein an opening 40 of an end portion 1a of a discharge tube 1 is sealed by a joining portion 6E of the invention.

In each embodiment described above, the inventive joining portion is provided between the outer surface of the metal member and the inner wall surface of the end portion of the ceramic discharge tube or the sealing member. In the other words, the above inventive joining portions do not seal the opening in the end portion of the ceramic discharge tube or through hole of the sealing member. However, the inventive joining portion has high resistance to corrosion and therefore may seal the opening of the ceramic discharge tube by itself, by contacting the intermediate ceramic composition layer with the inner wall surface, facing the opening, and by sealing it with the intermediate ceramic composition layer and the main phase with preserved air-tightness. Alternatively, the intermediate ceramic composition layer may be contacted with the inner wall surface, facing the through hole of the sealing member, to seal the through hole by this intermediate ceramic composition layer and the main phase with preserved air-tightness. In these cases, the metal member is joined to the main phase without passing through the joining portion. FIGS. 20 and 21 relate to such embodiments.

In the embodiment of FIG. 20, a first sealing member 37 is inserted within an inner surface 38b near an end face 38c of the ceramic discharge tube 38 of a high pressure discharge lamp. An outer surface 38a of the discharge tube 38 extends straightforwardly in its longitudinal direction. The thickness of the discharge tube 38 is substantially uniform. A second cylindrical sealing member 39 is inserted within the interior of the first sealing member 37. The sealing members 37 and 39 are made of a ceramic or cermet, same as the sealing members described above. The inventive joining portion 6D is formed within the second sealing member 39.

When forming the joining portion 6D, a porous bone structure is inserted within the sealing member 39. Preferably, a metal member 35 and a metal axis 27, made of molybdenum, is joined to the bone structure in advance. When the outer diameter of the porous bone structure and the inner diameter of the inner wall surface 39a of the sealing member 39 is strictly adjusted to the same value, it might be impossible to insert the bone structure due to the dimension clearance. Preferably, a clearance of 0.05 to 0.10 mm is provided. When inserting the porous bone structure and melting a ceramic material on the bone structure, the ceramic is impregnated into the porous bone structure to form main phase 14D and an intermediate ceramic composition layer 13D is formed in the clearance of the bone structure and sealing member 39.

Consequently, the through hole 46 of the sealing member 39 is substantially sealed by the main phase 14D and the intermediate ceramic composition layer 13D is formed within the clearance between the main phase 14D and the inner wall surface 39a of the sealing member 39. The axis 27 is joined onto the surface, facing the inner space 17, of the main phase 14D and a metal member 35 is joined to the outer surface of the main phase 14D. A ceramic composition layer 45 is further formed within the clearance between the metal member 35 and sealing member 39.

In the embodiment shown in FIG. 21, as shown in FIG. 20, the inventive joining portion 6E is formed within an opening 40 of the end portion 1a of the discharge tube 1.

When forming the joining portion 6E, a porous bone structure is inserted into the inner opening 40 of the end portion 1a of the discharge tube 1. A metal member 35 and a metal axis 27 are joined to the bone structure in advance. A clearance, preferably of 0.05 to 0.10 mm, is provided between the outer surface of the bone structure and the inner surface 1b of the discharge tube 1. When inserting the porous bone structure and melting the ceramic material on the bone structure, the melted ceramic is impregnated into the porous bone structure to form main phase 14E and an intermediate glass layer 13E is formed in the clearance between the main phase 14E and the discharge tube 1.

The relationship among the clearance between the outer surface of the bone structure and the inner surface of the discharge tube, the insertion of the electrode system (easiness to insert), and the fullness of ceramic composition into the bone structure is shown as follows.

TABLE 3

| | evaluation item | |
|---|---|---|
| clearance (mm) | insertion (easiness to insert) | fullness of ceramic composition in porous bone |
| 0.03 | Δ | ⊚ |
| 0.05 | ○ | ⊚ |
| 0.08 | ⊚ | ⊚ |
| 0.10 | ⊚ | ○ |
| 0.12 | ⊚ | Δ |

⊚: excellent
○: good
Δ: average

If the clearance is 0.03 mm, the outer surface of the bone structure makes contacts with the inner surface of the discharge tube and thus the bone structure may be damaged when the electrode system inclines to the insertion direction of thereof. On the other hand, if the clearance is 0.12 mm, the ceramics composition is not filled into the bone structure and thus the ceramics composition may flow downward.

Next, the most preferred process for producing high pressure discharge lamps according to embodiments of the invention will be described. When using a sealing member, powdery raw material (preferably alumina powder) of the sealing member is shaped into a shaped body, with a shape of a ring, of the sealing member. At this stage, it is preferred to press-mold granules, granulated with a spray drier or the like, under a pressure of 2000 to 3000 kgf/cm$^2$. The resulting shaped body may preferably be subjected to dewaxing and calcination to obtain a calcined body, which is then finish-sintered at a temperature between 1600 to 1900° C. under reducing atmosphere of a dew point of −15 to 15° C.

The dewaxing process may preferably be carried out at a temperature of 600 to 800° C. and the calcination process may preferably be carried out at a temperature of 1200 to 1400° C. under reducing atmosphere of hydrogen. The calcination may provide a some degree of strength to the shaped body of the sealing member and facilitate the handling of the sealing member. A hollow may be formed, for example by machining.

Also, metal powder is formulated, crushed, dried, and milled with an added binder, such as ethyl cellulose, acrylic resin or the like, to obtain paste, which is then applied onto the outer surface of the end portion of the metal member and dried at a temperature of 20 to 60° C. The resulting calcined body is sintered under reducing or inert atmosphere or vacuum of a dew point of 20 to 50° C. at a temperature of 1200 to 1700° C.

Also, a main body of a ceramic discharge tube is shaped, dewaxed and calcined to obtain a calcined body of the ceramic discharge tube. A pre-sintered body of the sealing member is inserted into the end portion of the resulting calcined body, set at a predetermined position and finish-sintered under reducing atmosphere of a dew point of −15 to 15° C. at a temperature of 1600 to 1900° C. to obtain a ceramic discharge tube.

Also, powder or frit is pre-formulated to a predetermined ceramic composition, crashed, granulated with an added binder such as polyvinyl-alcohol or the like, press-molded and dewaxed to obtain molding material. Alternatively, powder or frit for a ceramic is melted and solidified to obtain solid, which is then crashed, granulated with added binder, press-molded and dewaxed. In this case, it is preferred to add 3 to 5 weight percent of a binder to the powder, to press-mold at a pressure of 1 to 5 ton, to dewax at about 700° C. and to calcine at a temperature of 1000 to 1200° C.

Such discharge tube, sealing member, metal member, porous bone structure and molding material are assembled as shown in FIG. 1 and heated to a temperature of 1000 to 1600° C. under non-oxidizing atmosphere.

The ceramic discharge lamp as described referring to FIGS. 1 to 7 was produced according to the above process. The ceramic discharge tube and sealing member was made of alumina ceramic, and a pipe made of molybdenum is used as the metal member. Molybdenum powder with an average particle diameter of 3 µm was used as the porous bone structure, and ethyl cellulose is used as a binder. The molybdenum powder had a tap density of 2.9 g/cc. The composition of the impregnated ceramic phase and the intermediate ceramic layer were dysprosium oxide 20 weight percent, lanthanum oxide 17 weight percent, alumina 35 weight percent, yttrium oxide 20 weight percent and silica 8 weight percent. In the resulting joined layer, crystallinity of the ceramic constituting thereof was 80 percent.

The ceramic discharge tube was subjected to a thermal cycle test. Particularly, in one cycle, its temperature is maintained at a room temperature for 15 minutes, increased to 1050° C., maintained at 1050° C. for 5 minutes and decreased to a room temperature. 1000 thermal cycles were performed. After that, helium leak test was performed to investigate the leakage of helium. The leak rate was lower than $10^{-10}$ atm.cc.sec.

850° C. is a temperature normally utilized and 1050° C. is an overloaded temperature. The resistance to the latter means that the discharge tube may safely preserve a starter gas and an ionizable light-emitting substance therein for a longer period of time, even when the gas and substance is introduced into the discharge tube under a pressure higher than a normal value.

Besides, FIGS. 4 and 5 are photomicrographs, taken by a scanning type electron microscope, showing the region near the interface between the inner surface of a metal member 7 and a sealing member 4 of this embodiment.

Also another high pressure discharge lamp was produced according to the above process. However, the composition of the ceramic was dysprosium oxide 47 weight percent, alumina 48 weight percent, yttrium oxide 1 weight percent and silica 4 weight percent. In the resulting joined layer, crystallinity of the ceramic constituting impregnated ceramic phase and the intermediate ceramic layer was 90 percent.

The ceramic discharge tube was subjected to a thermal cycle test. Particularly, in one cycle, its temperature is maintained at a room temperature for 15 minutes, increased to 1050° C., maintained at 1050° C. for 5 minutes and decreased to a room temperature. 1000 thermal cycles were performed. After that, helium leak test was performed to investigate the leakage of helium. The leak rate was lower than $10^{-10}$ atm.cc.sec.

When a sealing member is not applied in a high pressure discharge lamp, a main body of a ceramic discharge tube is shaped to obtain a shaped body, which is then dewaxed, calcined and finish-sintered. Also, paste of metal powder is produced as described above, applied or printed onto the surface of a metal member and subjected to heat treatment to form a porous bone structure. After the discharge tube and metal member are assembled and the above-described material is set, they are heat-treated as described above to obtain a high pressure discharge lamp.

The inventive joined body and joining method may be widely applied to, other than a high pressure discharge lamp, all the structural bodies, such as a switching device of vacuum, having a conductive portion or terminal whose air-tightness at a high temperature of about 900° C. is indispensable.

The present invention has been explained referring to the preferred embodiments, however, the present invention is not limited to the illustrated embodiments which are given by way of examples only, and may be carried out in various modes without departing from the scope of the invention. Recently, it is the worldwide requirement to use high pressure Xe gas instead of mercury in the high pressure discharge lamp. According to the strength at the elevated temperature achieved by the high pressure discharge lamp of the present invention, it is possible to endure the rising of the internal pressure occurred at the ignition of the high pressure discharge lamp which does not contain the mercury. As a result, the high pressure discharge lamp according to the present invention can be applied to not only a lamp for general lighting but also a head lamp for vehicle.

What is claimed is:

1. A joined body of a first member made of a metal and a second member made of a ceramic or a cermet,
   wherein said joined body comprises a joining portion interposed between said first member and said second member for joining said first and second members,
   said joining portion comprising main phase contacting said first member and an intermediate ceramic composition layer contacting said second member and existing between said second member and said main phase, and
   said main phase comprising a porous bone structure with open pores and made of a sintered product of powder of a metal, and said main phase further comprising ceramic composition layer impregnated into said open pores in said porous bone structure
   each of said intermediate ceramic composition layer and said impregnated ceramic composition layer has a crystallinity of more than 50%.

2. The joined body of claim 1, wherein said intermediate ceramic composition layer and said impregnated ceramic composition layer contain a main component of said ceramic or said cerment constituting said second member.

3. The joined body of claim 1, wherein said metal constituting said porous bone structure contains a main component of said metal constituting said first member.

4. The joined body of claim 1, wherein said intermediate ceramic composition layer and said impregnated ceramic composition layer are made of ceramic materials comprising the same ingredient system.

5. The joined body of claim 1, wherein said porous bone structure has a porosity of open pores of not lower than 30% and not higher than 80%.

6. The joined body of claim 1, wherein each of said intermediate ceramic layer and said impregnated ceramic phase has a crystallinity of not lower than 60%.

7. The joined body of claim 6, wherein each of said intermediate ceramic layer and said impregnated ceramic phase has a crystallinity of not lower than 70%.

8. The joined body of claim 7, wherein each of said intermediate ceramic layer and said impregnated ceramic phase has a crystallinity of not lower than 80%.

9. The joined body of claim 1, wherein each of a ceramic constituting said intermediate ceramic composition layer and a ceramic constituting said impregnated ceramic composition layer comprises one or more oxide selected from the group consisting of $Al_2O_3$, $Sc_2O_3$, $Y_2O_3$, $La_2O3$, $Gd_2O_3$, $Dy_2O_3$, $Ho_2O_3$, $Tm_2O_3$, $SiO_2$, $MoO_2$ and $MoO_3$.

10. The joined body of claim 9, wherein each of a ceramic constituting said intermediate ceramic composition layer and a ceramic constituting said impregnated ceramic composition layer comprises three or more oxides selected from the group consisting of $Al_2O_3$, $Sc_2O_3$, $Y_2O_3$, $La_2O_3$, $Gd_2O_3$, $Dy_2O_3$, $Ho_2O_3$, $Tm_2O_3$, $SiO_2$, $MoO_2$ and $MoO_3$.

11. The joined body of claim 10, wherein each ceramic has a content of $SiO_2$ of not higher than 15 weight percent.

12. The joined body of claim 11, wherein each ceramic has a content of $SiO_2$ of not lower than 5 ppm.

13. The joined body of claim 1, wherein said first member comprises one or more metal selected from the group consisting of molybdenum, tungsten, rhenium, niobium, tantalum and the alloys thereof.

14. The joined body of claim 1, wherein said second member comprises a ceramic selected from the group consisting of alumina, magnesia, yttria, lanthania and zirconia, or a cermet containing said ceramic.

15. The joined body of claim 1, wherein each of a material constituting said intermediate ceramic composition layer and a ceramic constituting said impregnated ceramic composition layer has a melting point not more than a temperature subtracted 200° C. from a melting point of a ceramic or a cerment constituting said second member.

* * * * *

UNITED STATES PATENT AND TRADEMARK OFFICE
CERTIFICATE OF CORRECTION

PATENT NO. : 6,812,642 B1
DATED : November 2, 2004
INVENTOR(S) : Norikazu Niimi

It is certified that error appears in the above-identified patent and that said Letters Patent is hereby corrected as shown below:

Column 15,
Line 4, change "cerment" to -- cermet --

Column 16,
Line 1, change "La$_2$O3" to -- La$_2$O$_3$ --
Line 26, change "cerment" to -- cermet --

Signed and Sealed this

First Day of February, 2005

JON W. DUDAS
*Director of the United States Patent and Trademark Office*